United States Patent [19]  
Sprenkle, Jr.

[11] 4,207,402  
[45] Jun. 10, 1980

[54] FOAMABLE POLYMERIC ALLOY COMPOSITION

[75] Inventor: William E. Sprenkle, Jr., Wilbraham, Mass.

[73] Assignee: Monsanto Company, St. Louis, Mo.

[21] Appl. No.: 955,685

[22] Filed: Oct. 30, 1978

[51] Int. Cl.² .............................. C08J 9/10; C08J 9/08
[52] U.S. Cl. ...................................... 521/139; 521/95; 525/74
[58] Field of Search ............ 521/139; 260/874, 876 R; 525/74

[56] References Cited  
U.S. PATENT DOCUMENTS 2,971,939  2/1961  Baer .................................. 260/876 R  
4,048,208  9/1977  Spicuzza, Jr. ........................ 264/45.9

Primary Examiner—Morton Foelak  
Attorney, Agent, or Firm—Joseph S. Nelson; William J. Farrington; Edward P. Grattan

[57] ABSTRACT

The present invention relates to a foamable alloy composition comprising, a styrenic polymer including its copolymers and rubber reinforced styrenic polymers in combination with a styrene maleic anhydride interpolymer and a gas liberating compound wherein said interpolymer is present in said polyblend in amounts of 15 to 50% by weight providing a superior structural foam molding composition having fast molding cycles and fine cell structure.

39 Claims, No Drawings

FOAMABLE POLYMERIC ALLOY COMPOSITION

BACKGROUND OF THE INVENTION

Structural foam plastics are being developed for appliance, automotive and furniture uses providing lower cost, light-weight products having high utility. Such products are molded from compositions that will foam under molding conditions wherein the gas liberating agent will provide gases in situ, at elevated molding temperatures, that blow the molded composition reducing its density by 2 to 50%.

Such foamable moldable compositions will fill injection molds readily, however, the set-up or cooling time in the mold has been longer than for conventional molding causing molding costs to be higher, offsetting the lower material cost advantages.

It is the objective of the present invention to provide foamable polyblend compositions that can be foamed and molded simultaneously with shorter cycles than conventional foamable polymeric materials.

U.S. Pat. No. 3,268,636 discloses a process for the injection molding of foamed plastic articles, teaching the general concepts of molding foamable plastic using thermoplastics and various blowing agents. U.S. Pat. No. 2,941,964 discloses foamable polystyrene compositions for extrusion using low boiling alipahtic hydrocarbons and chemical compounds as nucleating agents as they release gases. Here, chemical blowing agents alone fail to give low density foamed materials and the aliphatic hydrocarbons are the essential blowing agent to give low density foams if properly nucleated. U.S. Pat. No. 3,231,524 discloses a method for extrusion of low density foamed plastic sheets using volatile aliphatic hydrocarbons injected during extrusion wherein the foam is nucleated with minor amounts (0.3 to 5%) of a carboxylic acid monomer copolymer. The aliphatic hydrocarbon provides an easily extrudable gel that foams on pressure release at the die giving low density foam sheet.

The present invention relates to moldable foamable alloys of relative high density that can be used as structural tough molded articles for furniture, appliances and automotive. Styrenic plastics such as polystyrene, styrene-acrylonitrile copolymers and rubber reinforced styrene polymers are used conventionally for such molded articles having high modulus and toughness along with excellent melt flow properties for molding. Such materials when foamed with aliphatic blowing agents are plasticized with the blowing agents, hence, loose modulus and more importantly have longer set-up times or molding cycles.

It has now been found, unexpectedly, that alloys of high heat distortion interpolymers, in particular alkenyl aromatic-maleic anhydride interpolymers with styrenic polymers, in amounts of 15 to 50% by weight, provide alloys that foam readily with chemical blowing agents to produce fine cell structure yet provide moldable polymeric alloy compositions that have reduced molding cycles and excellent structural engineering properties even though the density has been reduced 2 to 50%.

SUMMARY OF THE INVENTION

The present invention relates to a foamable moldable polymeric alloy composition consisting essentially of:

A. an addition polymer selected from the group consisting of:
 1. a polymer of at least one alkenyl aromatic monomer,
 2. a copolymer of said alkenyl aromatic monomer and an alkenyl nitrile monomer,
 3. a grafted diene rubber grafted with monomers selected from the group consisting of alkenyl aromatic, alkenyl nitrile, maleic anhydride and mixtures thereof and mixtures of (1), (2) and (3),
B. an interpolymer of an alkenyl aromatic monomer and maleic anhydride, wherein the weight ratio of said addition polymer to said interpolymer in said alloy is about 85:15 to 50:50,
C. a foaming agent selected from the group consisting of alkali and alkaline earth carbonates and bicarbonates, azo, hydrazine, azide and amide compounds, nitrogen, carbon dioxide or mixtures thereof.

PREFERRED EMBODIMENTS

The alkenyl aromatic monomers can be selected from the group consisting of styrene, alpha methyl styrene, halogenated alkenyl aromatic such as chlorostyrene and bromostyrene or mixtures thereof. The alkenyl nitrile monomers can be selected from the group consisting of acrylonitrile and methacrylonitrile or mixtures thereof. The copolymers of alkenyl aromatic and alkenyl nitrile monomers have a weight ratio of said monomers of 85:15 to 15:85 respectively.

The interpolymer of alkenyl aromatic and maleic anhydride monomers preferably have a weight ratio of said monomers of 65:35 to 95:5 respectively.

The diene rubbers are rubbers of conjugated diene monomers, said rubbers being selected from the group consisting of polybutadiene, polyisoprene, polychloroprene and copolymers of butadiene-styrene, butadiene-acrylonitrile wherein the butadiene moiety is greater than 50% preferably greater than 75%.

The grafted diene rubbers are the disclosed diene rubbers grafted with monomers selected from the group consisting of alkenyl aromatic, alkenyl nitrile, maleic anhydride or mix-thereof. Said rubber is dispersed in said alloy as rubber particles grafted with about 10 to 100 parts of said monomer per 100 parts of rubber having a particle size of about 0.05 to 1.5 microns. Alternatively, the rubber can be dispersed as rubber particles being grafted with and having occluded polymers of said monomers wherein said grafted and occluded polymers are present in amounts of from about 0.5 to 5 parts per 100 parts of rubber, said rubber particles having a particle size of about 0.5 to 30 microns. The particle size is a weight average particle size diameter as determined by a Centrifugal Photosedimentometer (Model 3000 Particle Size Analyzer from Martin Sweets Co., 3131 West Market Street, Louisville, Ky.). The grafted diene rubbers can be present in said alloy in amounts such that the diene rubber moiety is present in amounts of about 2 to 35% by weight of said alloy.

Gas liberating compounds can be used as foaming agents and are selected from the group consisting of alkali and alkaline earth carbonates and bicarbonates, e.g., sodium and potassium carbonates or bicarbonates, azo, hydrazide and amide compounds and mixtures thereof. The zo compounds can be, e.g., diazoaminobenzene, 1,3-diphenyl triazene, azo dicarbonamide, 1,1'-azo-bis-formamide, 2-2'-azo-isobutyronitrile and azo-hexahydrobenzonitrile. The hydrazide can be, e.g., benzene sulfonylhydrazide, p,p'-oxy-bis-benzene sulfonylhydrazide. The azide can be, e.g., p-tert-butyl benzolazide. The amide can be, e.g., N,N'-di-methyl-N,N' dinitrosoterephthalamide. The hydrozines can be, e.g., a trihydrazide triazene. The gas liberating compound is present in said alloy in an amount of about 0.2 to 2.0% by weight of said alloy preferably in amounts of about 0.3 to 0.7% by weight. Depending on the alloy polymers, copolymers and interpolymers used and their molecular weight, sufficient gas liberating compound should be used to reduce the density of said alloy composition of about 2 to 50% by weight when foamed by melt processing at temperatures of about 200° to 275° C.

The polymers and copolymers can have a weight average (Mw) of about 100,000 to 300,000 and the interpolymers having a weight average (Mw) molecular weight of about 50,000 to 500,000, preferably about 120,000 to 400,000. The styrenic polymers can be prepared by conventional means, e.g., polystyrene by mass or suspension polymerization. Rubber reinforced polystyrene can be produced by mass or suspension polymerization.

Such rubber reinforced polystyrene polymers have a rubber phase grafted with styrene monomers dispersed in a polystyrene matrix phase as grafted rubber particles known as high impact polystyrene or HIPS polyblends. The rubber particles are grafted with and have occluded polystyrene in amounts of from about 0.5 to 5.0 parts per part of rubber as disclosed supra. The interpolymer can be dispersed in HIPS polymers which is a mixture of a polymer and a grafted diene rubber, said rubber being present in the HIPS as a rubber moiety of 2 to 15% by weight. Such process is described in Practical Polymerization of Polystyrene by R. B. Bishop, Cahner Publishing Co., 221 Columbus Avenue, Boston, Mass. Styrene-acrylonitrile copolymers including rubber modified SAN polymer or ABS can be prepared by methods disclosed in ABS Plastics by C. H, Basdekis, Reinhold Publishing Corp., New York, N.Y.

Such ABS materials have a styrene-acrylonitrile (SAN) copolymer matrix phase having dispersed therein diene rubber particles grafted with S/AN monomers as a polyblend. The grafted rubber phase is present in an amount of 2 to 35% by weight as a rubber moiety. The rubber particles can have a weight average diameter of about 0.5 to 1.5 microns being grafted with 10 to 100 parts of monomers per 100 parts of rubber. Alternatively, the rubber particles can be grafted with and have occluded SAN copolymers in amounts of 0.5 to 5 parts per part of rubber as disclosed supra. The interpolymer can be dispersed in ABS polyblends forming mixtures of SAN copolymer, grafted diene rubber and interpolymer. The interpolymers of styrene-maleic anhydride can be prepared by the methods disclosed in U.S. Pat. No. 2,971,939. Diene rubbers grafted with styrene and maleic anhydride can be prepared by the methods of U.S. Pat. No. 2,971,939 by dissolving 1 to 15% of a diene rubber in the styrene monomer prior to copolymerization with the maleic anhydride. The final product is a diene rubber grafted with styrene and maleic anhydride dispersed in a matrix phase of styrene-maleic anhydride interpolymer.

The examples infra are included to further illustrate the invention but do not limit the scope of the invention.

EXAMPLE 1

About 50 parts of high impact polystyrene polyblend (HIPS) containing polystyrene with about 5% by weight of a rubber moiety as grafted rubber particles was dry blended with about 50 parts of a styrene-maleic acid copolymer having a molecular weight of about 300,000 Mw, having about 8% maleic acid and about 0.5 parts of azo dicarbonamide and fed to an extrusion-molding apparatus as described in U.S. Pat. No. 3,268,636. The material was foamed and molded at 450° F. (230° C.) into $\frac{1}{2}"\times\frac{1}{2}"\times 5"$ bars. (1.25 cm × 1.25 cm × 6.25 cm). The set up time in the mold was found to be 60 seconds with a mold temperature of about 80° F. (37° C.). The same high impact polystyrene without the styrene-maleic anhydride polymer was mixed with about 0.5 parts of azo dicarbonamide was extrusion-molded under the same conditions. The set up time was found to be 100 seconds on the molded article. It is evident from the molding test that the alloy molds with a set-up time reduction of about 40%. The molded bars were cut and examined for cellular structure. The alloy had a uniform distribution of fine cells with excellent surface quality whereas the high impact polystyrene had a random dispersion of small and large cells giving a less uniform molding with poor surface quality.

EXAMPLE 2

Example 1 was repeated using several alloy compositions. The alloys were tested by molding and cellular analysis. All elements are shown in parts as described in Table 1.

It is evident from the molding tests in Table 1 infra that the compositions of the present invention have a lower set-up time when molded and provides a fine cell structure in the molded article. Those skilled in the art recognize that the set-up time is that time after which a molded article can be removed from the mold without distortion, e.g., molded foamed $\frac{1}{2}"\times\frac{1}{2}"\times 5"$ bars, when immediately removed from the mold, will not show a deflection of more than 0.2 inches under its own weight if supported at its ends at room temperature, i.e., if the molded piece does not deflect more than 0.2 inches the molded piece is set up as removed from the mold. This is a relative test and characterizes ability of the molded material to set up in a conventional mold.

TABLE 1

| Example | Polymer[1] Copolymer[2] or Graft Polymer[3] | SMA[4] | Gas Liberating Agent | Set-Up Time (sec.) | Comparative[7] Set-Up Time (sec.) | Cell Size |
|---|---|---|---|---|---|---|
| 2 | HIPS-75/5 | 25/8 | 0.5[5] | 80 | 100 | fine |
| 3 | HIPS-85/5 | 15/8 | 0.5[5] | 85 | 100 | fine |
| 4 | PS-50 | 50/8 | 0.5[5] | 45 | 80 | fine |
| 5 | PS-85 | 15/8 | 0.5[5] | 68 | 80 | fine |
| 6 | SAN-50 | 50/8 | 0.5[5] | 50 | 85 | fine |
| 7 | SAN-85 | 15/8 | 0.5[5] | 70 | 85 | fine |
| 8 | ABS-50/5 | 50/8 | 0.5[5] | 66 | 110 | fine |
| 9 | ABS-85/5 | 15/8 | 0.5[5] | 89 | 110 | fine |
| 10 | HIPS-50/5 | 50/12 | 0.5[5] | 52 | 100 | fine |
| 11 | PS-50 | 50/12 | 0.5[5] | 41 | 80 | fine |

TABLE 1-continued

| Example | Polymer[1] Copolymer[2] or Graft Polymer[3] | SMA[4] | Gas Liberating Agent | Set-Up Time (sec.) | Comparative[7] Set-Up Time (sec.) | Cell Size |
|---|---|---|---|---|---|---|
| 12 | SAN-50 | 50/26 | 0.5[5] | 46 | 85 | fine |
| 13 | ABS-50/5 | 50/26 | 0.5[5] | 53 | 110 | fine |
| 14 | HIPS-50/5 | 50/8 | 0.2[5] | 60 | 100 | fine |
| 15 | PS-50 | 50/8 | 0.2[5] | 45 | 80 | fine |
| 16 | SAN-50 | 50/8 | 0.2[5] | 52 | 85 | fine |
| 17 | ABS-50/5 | 50/8 | 0.2[5] | 67 | 110 | fine |
| 18 | HIPS-50/5 | 50/8 | 1.0[5] | 64 | 100 | fine |
| 19 | PS-50 | 50/8 | 1.0[5] | 46 | 80 | fine |
| 20 | SAN-50 | 50/8 | 1.0[5] | 51 | 85 | fine |
| 21 | ABS-50/5 | 50/8 | 1.0[5] | 66 | 110 | fine |
| 22 | HIPS-50/5 | 50/8 | 0.5[6] | 61 | 100 | fine |
| 23 | PS-50 | 50/8 | 0.5[6] | 44 | 80 | fine |
| 24 | SAN-50 | 50/8 | 0.5[6] | 52 | 85 | fine |
| 25 | ABS-50/5 | 50/8 | 0.5[6] | 66 | 110 | fine |

[1]Polymer-polystyrene or PS
[2]Copolymer-styrene-acrylonitrile or SAN
[3]Graft copolymers-polybutadiene rubber grafted with styrene and having PS matrix phase called (HIPS) with rubber shown as % of HIPS, i.e., parts HIPS/% rubber -polybutadiene rubber grafted with styrene-acrylonitrile and having SAN matrix phase called ABS with rubber shown as % of ABS, i.e., parts ABS/% rubber
[4]SMA is styrene-maleic anhydride interpolymer with % maleic anhydride shown as parts SMA/% MA
[5]azo biscarbamide
[6]sodium bicarbonate
[7]time for foamed styrenic polymer to set up without interpolymer in composition

EXAMPLE 26

Example 1 was repeated using nitrogen gas as blowing agent. Nitrogen gas was slowly fed to the barrel, the extruder and mixed with the molten alloy composition without a gas liberating compound. The bars were molded at 230° C., and found to have a set-up time of about 63 second with a mold temperature of about 80° F. (27° C.). The bars were found to have a uniform fine cell structure.

EXAMPLE 27

Example 26 was repeated using carbon dioxide gas as a blowing agent instead of nitrogen. The bars were molded at 230° C., and found to have a set-up time of about 65 second with mold temperature of 80° F. (26° C.). The bars were found to have a uniform fine cell structure.

It is evident that nitrogen and carbon dioxide can be used as foaming agents. These can be incorporated in the composition as gases or as liquids by injection into the melt and mixed under pressure in the extruder. Solid carbon dioxide can be dry blended with the polymers and fed to an extruder forming a blend during melt extrusion. Nitrogen and carbon dioxide can be present in said composition in amount of about 2 to 15% by weight preferably 5 to 10% by weight in sufficient quantities to reduce the density of the alloy 5 to 50% when foamed by melt processing at temperatures of about 200° to 275° C.

Compositions of the present invention formulated with halogen compounds to reduce flame spread have been tested and found to have improved molding properties as shown infra.

EXAMPLE 28

Example 1 was repeated using the following composition:

| | Parts |
|---|---|
| HIPS polyblend[1] | 45 |
| Styrene/Maleic Anhydride Interpolymer[2] | 45 |
| Decabromodiphenyl oxide | 7 |
| $Sb_2O_3$ | 3 |
| Set-up Time (sec.) by test supra | 32 |
| UL-94 test[3] | V-O |

[1]Polystyrene containing 8% rubber grafted with polystyrene.
[2]SMA containing 10% rubber grafted with SMA with MA at 8%.
[3]The molded bars have a Underwriters Laboratory Test UL-94 value of V-O. (The flammability reported herein are not intended to reflect hazards presented by the presently claimed materials or any other material under actual fire conditions).

EXAMPLE 29

CONTROL

Example 28 was repeated using the following composition:

| | Parts |
|---|---|
| HIPS[1] | 85.5 |
| Fire Retard (Decabromodiphenyl oxide) | 10.0 |
| $Sb_2O_3$ | 4.5 |
| Set-up time (sec.) | 45 |
| UL-94 test | V-O |

It is evident that the present composition having a halogen compound incorporated therein mold with efficient set-up times and have desirable ratings under the UL-94 test.

The halogen compounds that can be used in the present invention are those that are stable to the extrusion and molding temperature of the composition, i.e., 200° to 275° C.

The Modern Plastics Encyclopedia, McGraw Hill, Inc., New York, N.Y., has a comprehensive listing of such additives for styrenic polymers.

Such additives for styrenic polymers include those providing a halogen (bromine or chlorine) source, e.g., halogen containing polymers, rubbers, phenolics, aliphatics, aromatic and other hydrocarbon organic materials. Included in the polymeric materials are e.g., polyvinyl chloride, polychloroprene, chlorinated polyethylene, halogenated paraffins containing 6 to 36 carbon atoms preferably 12 to 24 which are stable within the processing temperatures. Included in the halogenated aromatic are aromatic compounds with aryl groups having $C_6$ to $C_{18}$ carbon atoms, e.g., decabromodiphenyl ether, bis(tribromo and pentabromo-phenoxyethane), tetrabromobisphenyl S, tetrabromobisphenyl A-dimethylether or diacetate, pentabromoethylbenzene, tetrabromoxylene, hexachloro and hexabromo benzene. Halogenated heterocylics are included having 5 to 8 members in the ring and containing as a component of the ring, a nitrogen, sulfur or oxygen atome, e.g., furan, pyridine and pyrimidine. Such materials as hexachlorocyclopentadiene and other aliphatic materials, e.g., pentabromochlorocylohexane are included. The halogenated organo phosphates are included.

Synergistic inorganic compounds that activate the halogenated materials providing halogens to retard burning can be included in the system, e.g., $Sb_2O_3$, $Al_2O_3$, zine borate, $Fe_2O_3$ and other inorganic materials including borophosphates and complex phosphates, e.g., zinc, antimony, polyalkyphosphates.

What is claimed is:

1. A foamable moldable polymeric alloy composition for structural foams consisting essentially of:
   A. an addition polymer polyblend which comprises a mixture of a major amount of:
     1. a polymer of at least one alkenyl aromatic monomer,
     and a minor amount of:
     2. A grafted diene rubber, grafted with said alkenyl aromatic monomer,
   B. an interpolymer of an alkenyl aromatic monomer and maleic anhydride, wherein the weight ratio of said addition polymer to said interpolymer in said alloy is about 85:15 to 50:50, and
   C. a foaming agent selected from the group consisting of carbonates, bicarbonates, azo, hydrazides, hydrazines, azide and amide compounds, nitrogen, carbon dioxide or mixtures thereof.

2. An alloy of claim 1 wherein said polymer is polystyrene.

3. An alloy of claim 1 wherein said interpolymers is styrene-maleic anhydride wherein the ratio of styrene to maleic anhydride is 85:15 to 95:5.

4. An alloy of claim 1 wherein said diene rubber is selected from the group consisting of polybutadiene and copolymers of butadiene-styrene, butadiene-acrylonitrile, polychloroprene, polyisoprene or mixtures thereof.

5. An alloy of claim 1 wherein said diene rubber is grafted with styrene.

6. An alloy of claim 1 wherein said diene rubber is dispersed as rubber particles, said particles having present grafted and occluded polymers of polystyrene in an amount of about 0.5 to 5 parts per part of diene rubber and having a particle size of about 0.5 to 20 microns.

7. An alloy of claim 1 wherein said gas liberating compound is present in an amount of about 0.2 to 2.0% by weight based on said alloy.

8. An alloy of claim 1 wherein said compound is present in an amount sufficient to reduce the density of said alloy about 5 to 50% by weight when foamed by melt processing at temperatures of about 200° 275° C.

9. An alloy of claim 1 wherein said polymer has a molecular weight of about 100,000 to 300,000 Mw and said interpolymer has molecular weight of about 100,000 to 400,000 Mw.

10. An alloy of claim 1 wherein said grafted diene rubber is present in an amount such that the diene rubber moiety is present in amounts from 2 to 15% by weight of said alloy.

11. An alloy of claim 1 wherein said foaming agent is alkaline and/or alkaline metal earth carbonates and/or bicarbonates.

12. An alloy of claim 1 wherein said foaming agent is sodium bicarbonate.

13. An alloy of claim 1 wherein said compound is an azo compound selected from the group diazoaminobenzene, 1,3-diphenyl triazene, azo dicarbonamide, 1,1'-azo-bis-formamide, 2,2'-azo-isobutyronitrile and azo-hexahydrobenzonitrile or mixtures thereof.

14. An alloy of claim 1 wherein said compound is a hydrazide selected from the group consisting of benzene sulfonyl hydrazide, p,p'-oxy-bis-benzene sulfonylhydrazide.

15. An alloy of claim 1 wherein said compound is p-t-butyl benzolazide.

16. An alloy of claim 1 wherein said compound is N,N-dimethyl-N,N' dinitrosoterephthal-amide.

17. An alloy of claim 1 wherein said compound is a trihydrozaide triazene.

18. A foamable moldable polymeric alloy composition consisting essentially of:
   A. an addition polymer selected from the group consisting of:
     1. a copolymer of said alkenyl aromatic monomer and an alkenyl nitrile monomer,
     2. a grafted diene rubber grafted with said alkenyl aromatic and said alkenyl nitrile monomers or mixtures of (1) and (2), said mixtures having a major amount of (1) and a minor amount of (2),
   B. an interpolymer of an alkenyl aromatic monomer and maleic anhydride, wherein the weight ratio of said addition polymer to said interpolymer in said alloy is about 85:15 to 50:50, and
   C. a foaming agent selected from the group consisting of carbonates, bicarbonates, azo, hydrazides, hydrazines, azide and amide compounds, nitrogen, carbon dioxide or mixtures thereof.

19. An alloy of claim 18 wherein said copolymer is styrene-acrylonitrile wherein the ratio of styrene to acrylonitrile is about 85:15 to 15:85.

20. An alloy of claim 18 wherein said interpolymers are styrene-maleic anhydride wherein the ratio of styrene to maleic anhydride is 65:35 to 95:5.

21. An alloy of claim 18 wherein said diene rubber is selected from the group consisting of polybutadiene and copolymers of butadiene-styrene, butadiene-acrylonitrile, polychloroprene, polyisoprene or mixtures thereof.

22. An alloy of claim 18 wherein said diene rubber is dispersed as rubber particles grafted with styrene and acrylonitrile in amounts of 10 to 100 parts of monomer per 100 parts of rubber.

23. An alloy of claim 18 wherein said compound is present in an amount of about 0.2 to 2.0% by weight based on said alloy.

24. An alloy of claim 18 wherein said compound is present in an amount sufficient to reduce the density of said alloy about 5 to 50% by weight when foamed by melt processing at temperatures of about 200° to 275° C.

25. An alloy of claim 18 wherein said copolymer has a molecular weight of about 100,000 to 300,000 Mw and said interpolymer has a molecular weight of about 100,000 to 400,000 Mw.

26. An alloy of claim 18 wherein said grafted diene rubber is present in an amount such that the diene rubber moiety is present in an amount from 2 to 35% by weight of said alloy.

27. An alloy of claim 18 wherein said alloy composition includes a diene rubber grafted with styrene and maleic anhydride.

28. An alloy of claim 1 wherein said alloy composition includes a diene rubber grafted with styrene and maleic anhydride.

29. A foamable moldable polymeric alloy composition for structural foams consisting essentially of:
A. an addition polymer polyblend which comprises a mixture of a major amount of:
   1. polystyrene,
   and a minor amount of:
   2. a grafted diene rubber grafted with styrene monomer,
B. an interpolymer of styrene and maleic anhydride wherein the weight ratio of said addition polymer to said interpolymer in said alloy is about 85:15 to 50:50, and
C. a foaming agent selected from the group consisting of carbonates, bicarbonates, azo, hydrazides, hydrazines, azide and amide compounds, nitrogen, carbon dioxide or mixtures thereof.

30. A foamable moldable polymeric alloy composition consisting essentially of:
A. an addition polymer selected from the group consisting of:
   1. a copolymer of styrene-acrylonitrile monomer,
   2. a grafted diene rubber grafted with styrene-acrylonitrile monomers or mixtures of (1) and (2), said mixture having a major amount of (1) and a minor amount of (2),
B. an interpolymer of an alkenyl aromatic monomer and maleic anhydride, wherein the weight ratio of said addition polymer to said interpolymer in said alloy is about 85:15 to 50:50, and
C. a foaming agent selected from the group consisting of carbonates, bicarbonates, azo, hydrazides, hydrazines, azide and amide compounds, nitrogen, carbon dioxide or mixtures thereof.

31. A foamable composition of claim 1 wherein said foaming agent is nitrogen, said nitrogen being present in said composition in an amount sufficient to reduce the weight of said alloy 5 to 50% when foamed by melt processing at temperatures of 200° to 275° C.

32. A foamable composition of claim 1 wherein said foaming agent is carbon dioxide, said carbon dioxide being present in an amount sufficient to reduce the densities of said alloy about 5 to 50% when melt processed at temperatures of 200° to 275° C.

33. A foamable composition of claim 18 wherein said foaming agent is nitrogen, said nitrogen being present in said composition in an amount sufficient to reduce the weight of said alloy 5 to 50% when foamed by melt processing at temperatures of 200° to 275° C.

34. A foamable composition of claim 18 wherein said foaming agent is carbon dioxide, said carbon dioxide being present in an amount sufficient to reduce the densities of said alloy about 5 to 50% when melt processed at temperatures of 200° to 275° C.

35. A composition of claim 1 wherein said composition includes a diene rubber grafted with styrene and maleic anhydride.

36. A composition of claim 18 wherein said composition includes a diene rubber grafted with styrene and maleic anhydride.

37. A composition of claim 1 wherein a fire-retarding material, providing a halogen source, in an amount of about 2 to 30% by weight based on said composition.

38. A composition of claim 37 wherein said fire-retarding material is present in combination with an inorganic compound, said inorganic compound being present in an amount of about 0.01 to 20% by weight based on said composition.

39. A composition of claim 38 wherein said halogen source is selected from the group consisting of halogen containing polymers, rubbers, phenolics, aliphatic, aromatic and heterocylic compounds or mixtures thereof and wherein said inorganic material is selected from the group consisting of $Sb_2O_3$, $Al_2O_3$, $Fe_2O_3$, zincborate, borophosphates and complex polyphosphates.

* * * * *